United States Patent
Panda et al.

(10) Patent No.: US 12,461,819 B2
(45) Date of Patent: Nov. 4, 2025

(54) APPARATUS AND METHODS FOR MEMORY DATA INTEGRITY WITHIN DIE ARCHITECTURES

(71) Applicant: QUALCOMM Incorporated, San Diego, CA (US)

(72) Inventors: Subham Panda, Balasore (IN); Nileshkumar Chandrakantbhai Motawala, Surat (IN); Radhakrishna Mugada, Hyderabad (IN); Sri Ananda Sai Jannabhatla, Hyderabad (IN); Muzaffaruddin Mohammed, Hyderabad (IN); Jyothi Ramidi, Hyderabad (IN); Venkatesh Petnikota, Kurnool (IN)

(73) Assignee: Qualcomm Incorporated, San Diego, CA (US)

( * ) Notice: Subject to any disclaimer, the term of this patent is extended or adjusted under 35 U.S.C. 154(b) by 97 days.

(21) Appl. No.: 18/490,478

(22) Filed: Oct. 19, 2023

(65) Prior Publication Data
US 2025/0130898 A1 Apr. 24, 2025

(51) Int. Cl.
*G06F 11/10* (2006.01)
*G06F 11/00* (2006.01)
*H03M 13/00* (2006.01)

(52) U.S. Cl.
CPC ......... *G06F 11/1076* (2013.01); *H03M 13/00* (2013.01)

(58) Field of Classification Search
CPC .... G06F 11/1076; G06F 11/10; H03M 13/00; H04L 1/00
See application file for complete search history.

(56) References Cited

U.S. PATENT DOCUMENTS

| | | | | |
|---|---|---|---|---|
| 6,967,878 B2 * | 11/2005 | Dono | ................... | G11C 29/785 365/201 |
| 9,489,263 B2 * | 11/2016 | Hyun | ..................... | G11C 29/52 |
| 9,502,128 B2 * | 11/2016 | Lee | ......... | G11C 16/10 |
| 10,811,078 B2 * | 10/2020 | Cha | ........................ | G11C 11/406 |
| 11,626,181 B2 * | 4/2023 | Kim | ........................ | G11C 29/52 365/185.09 |
| 11,907,062 B2 * | 2/2024 | Choi | ...................... | G06F 11/106 |
| 11,955,159 B2 * | 4/2024 | Cho | .................. | G11C 11/40615 |

* cited by examiner

*Primary Examiner* — Justin R Knapp
(74) *Attorney, Agent, or Firm* — Smith, Tempel, Blaha LLC

(57) ABSTRACT

Methods and apparatuses directed to improving performance and data integrity within die architectures. In some examples, a die package includes a memory device, and a processor coupled to the memory device. The memory device may serve as a cache for another memory device. The processor receives a signal indicating that a number of errors have been detected. In response to the signal, the processor reads an error count corresponding to each of multiple memory rows of the memory device. Further, the processor determines a first memory row of the memory rows based on the error counts. The processor also determines a second memory row of the memory rows based on access data characterizing memory accesses of the plurality of rows. The processor further writes data stored at the first memory row to the second memory row of the memory device, and disables the first memory row.

20 Claims, 6 Drawing Sheets

APPARATUS AND METHODS FOR MEMORY DATA INTEGRITY WITHIN DIE ARCHITECTURES

BACKGROUND

Field of the Disclosure

This disclosure relates generally to die architectures and, more particularly, to providing for the integrity of data within memory components of die architectures.

Description of Related Art

Die architectures often include memory components that store data. For example, an integrated circuit may include a processor and a memory device, where the processor is able to write data to the memory device, and read data from the memory device. Data errors can occur due to various reasons. For example, data being written to memory may experience one or more data bit flips (e.g., due to timing issues), where an intended value of 0 or 1 being written to memory is stored as a value of 1 or 0, respectively. Similarly, data may be corrupted when being read out of memory, or even while stored in memory (e.g., due to random alpha particle bombardment, etc.). These soft errors may be radiation induced (e.g., due to particle strikes), or may be noise-induced, among other causes. In some instances, the memory device may endure a hard error (e.g., a stuck signal or memory bit) that may cause data corruption to one or more memory locations. As a result, data being written to or read from these memory locations may be corrupted, thereby reducing data integrity. To detect these data errors, some systems employ an error correction mechanism such as error correcting code (ECC). These error correction mechanisms can be costly in terms of die real estate required, and can require multiple signals to detect data errors, among other drawbacks. As such, there are opportunities to address these and other issues within die architectures.

SUMMARY

According to an aspect, a die package includes a processor communicatively coupled to a memory device. The processor is configured to receive a signal indicating that decoding errors have been detected. In response to the signal, the processor is configured to receive an error count corresponding to each of a plurality of memory rows of the memory device. The processor is also configured to determine a first memory row of the plurality of memory rows based on the error counts. Further, the processor is configured to determine a second memory row of the plurality of memory rows based on access data characterizing memory accesses of the plurality of rows. The processor is also configured to write data stored at the first memory row to the second memory row of the memory device.

According to another aspect, a method by a processor includes receiving a signal indicating that decoding errors have been detected. In response to the signal, the method includes receiving an error count corresponding to each of a plurality of memory rows of the memory device. The method also includes determining a first memory row of the plurality of memory rows based on the error counts. Further, the method includes determining a second memory row of the plurality of memory rows based on access data characterizing memory accesses of the plurality of rows. The method also includes writing data stored at the first memory row to the second memory row of the memory device.

According to yet another aspect, a non-transitory, machine-readable storage medium comprises instructions that, when executed by at least one processor, cause the at least one processor to perform operations. The operations include receiving a signal indicating that decoding errors have been detected. In response to the signal, the operations include receiving an error count corresponding to each of a plurality of memory rows of the memory device. The operations also include determining a first memory row of the plurality of memory rows based on the error counts. Further, the operations include determining a second memory row of the plurality of memory rows based on access data characterizing memory accesses of the plurality of rows. The operations also include writing data stored at the first memory row to the second memory row of the memory device.

According to even another aspect, a die package includes decoding logic, a memory device comprising a plurality of memory rows, and a processor communicatively coupled to the decoding logic and the memory device. The processor is configured to receive, from the decoding logic, a signal indicating that decoding errors have been detected. In response to the signal, the processor is configured to receive an error count corresponding to each of a plurality of memory rows of the memory device. The processor is also configured to determine a first memory row of the plurality of memory rows based on the error counts. Further, the processor is configured to determine a second memory row of the plurality of memory rows based on access data characterizing memory accesses of the plurality of rows. The processor is also configured to write data stored at the first memory row to the second memory row of the memory device.

According to yet another aspect, a die includes a row decoding logic coupled to a memory array. The row decoding logic is configured to receive address data, and generate a row selection signal. The die also includes a row error count buffer configured to maintain an error count for each row of the memory array. Further, the die includes at least one processor configured to write data stored at a first memory row of the memory array to a second memory row of the memory array.

DETAILED DESCRIPTION

Figure 1:
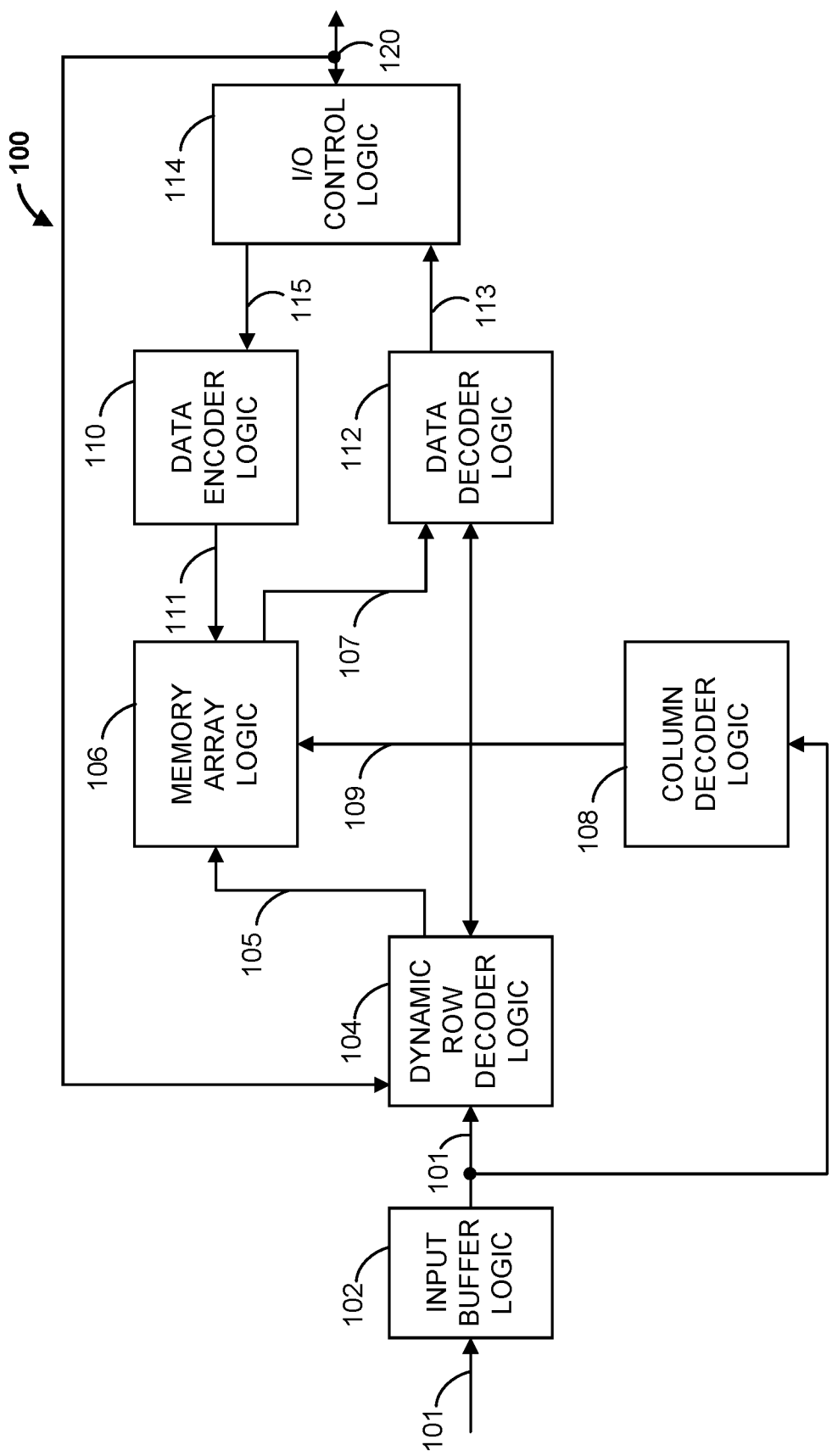
FIG. 1 is block diagram of an integrated circuit, according to some implementations.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

The embodiments described herein are directed to improving data integrity within die architectures, such as the data integrity within cache memories of die architectures. Die architectures can be used in various applications, such as within safety critical systems (e.g., to support of safety critical features in automotive systems). Maintaining a level of data integrity within these die architectures can be imperative and, in some instances, required. To improve data integrity within memory devices of die architectures, the embodiments may detect when a memory device has had at least a threshold number of errors (e.g., over a time interval), such as error correcting code (ECC) errors. The memory device may serve as a cache memory for other memory devices, such as slower access memories (e.g., main memory). The embodiments may map each such error to a memory row (e.g., a cache row) of the memory device, and may maintain a corresponding error count for each memory row.

When a threshold number of errors have been detected for the memory device, the embodiments may determine a first memory row with the highest error count. The embodiments may also determine a second memory row of the memory device, which may be a row that has been less recently accessed than the first memory row (e.g. the least recently accessed memory row). The second memory row may be, additionally or alternatively, a memory row of the memory device that has been accessed less often (e.g., the least often) and/or that has had less errors (e.g., the least errors) than the first memory row, for example. The embodiments may then write data from the first row of the memory device to the second memory row of the memory device. As such, memory addresses that before were associated with the first row of the memory device are now associated with the second row of the memory device. The embodiments may, in some examples, disable, at least for a period of time, the first memory row of the memory device, thereby preventing the first memory row from being used to store data. Once the period of time has expired, the embodiments may re-enable the first memory row of the memory device.

For instance, in some examples, a memory device, such as a static random-access memory (SRAM) device, implements a data cache (e.g., L1 or L2 data cache). The data cache stores more frequently accessed data thereby reducing latencies associated with accessing slower memory devices, such as main memory. For example, each row of the memory device may be associated with one or more memory addresses of main memory, and serve as a cache line for the one or more memory address of the main memory.

The memory device (e.g., implementing a data cache to main memory) is coupled to a dynamic row decoder, and a column decoder. When a request to access the memory device is received (e.g., a write request or read request), the dynamic row decoder can select a row of the memory device to access, and the column decoder can select a column of the memory device to access, based on the request. For example, the request may identify a memory address. The dynamic row decoder and the column decoder may generate signals that select a row and column, respectively, of the memory device based on the memory address.

The memory device may also be coupled to a data encoder and a data decoder. The data encoder may generate a correcting code by encoding data being written to the memory device. For example, upon receiving a write request for the memory address, the data encoder may generate an error correcting code (ECC), and may store the ECC along with the data at one or more memory locations of the memory device (i.e., one or more memory locations that correspond to the selected row and column of the memory device).

When a read request for the memory address is received, the data decoder may obtain the data from one or more memory locations (i.e., one or more memory locations that correspond to the selected row and column), as well as the ECC written by the data encoder. The data decoder may then generate a second ECC based on the read data, and may compare the second ECC to the read ECC to determine if they match (i.e., are the same value). If the second ECC and the read ECC do not match, the data decoder may log an error within a register, for example.

In some examples, when the data decoder detects an error (i.e., the ECC values do not match), the data decoder transmits a signal (e.g., an ECC error signal) to the dynamic row decoder. In response, the dynamic row decoder may increment an error count corresponding to the selected row for the data read request. For example, the dynamic row decoder may maintain a row error counts buffer that maintains, within corresponding error count memory locations, an error count for each row of the memory device. Each error count memory location of the row error counts buffer may be mapped to a row of the memory device. In some examples, the error count memory locations of the row error counts buffer are mapped to the memory rows of the memory device based on a hashing filter, such as a Bloom Count Filter (BCF). When the dynamic row decoder receives the error signal from the data decoder, the dynamic row decoder increments the error count within the error count memory location of the row error counts buffer corresponding to the selected memory row.

The dynamic row decoder may also include an access history buffer. The access history buffer stores data identifying the rows of the memory device that have been accessed. For example, the access history buffer may be a circular buffer that stores, at a first location, data identifying the most recently accessed row of the memory device, and, at a last location, data identifying the least recently accessed row of the memory device. When a request, such as a read request or a write request, for a particular memory address is received, the dynamic row decoder may update the access history buffer with data characterizing the memory row of the device that is to be accessed (e.g., read from or written to). In some examples, the dynamic row decoder may also determine a timestamp associated with the request (e.g., an absolute or relative time when the request is received), and may store the timestamp within the access history buffer as well.

In some examples, the dynamic row decoder may, upon receiving the error signal from the data decoder, determine which of the error count memory locations of the row error counts buffer has a greatest error count, and may determine a first row of the memory device corresponding to the greatest error count. For instance, the first row of the memory device may be associated with (e.g., serve as a cache line for) one or more memory locations of the main memory. The dynamic row decoder may also determine a second row of the memory device based on the data stored within the access history buffer. For example, the dynamic row decoder may determine a second row of the memory device that has been less recently accessed (e.g. the least recently accessed row) than the first row based on the data stored within the access history buffer. In some examples, the dynamic row decoder may determine a second row of the memory device that has been accessed less often (e.g., the least often) than the first row based on the data stored within the access history buffer. In some examples, the dynamic row decoder may determine a second row of the memory device that has had less errors (e.g., the least errors) than the first row based on the error count memory locations of the row error counts buffer.

The dynamic row decoder may then read data (e.g., tag information, stored data) stored in the first row of the memory device, and may write the read data to the determined second row. As such, the second row of the memory device is now associated with the memory locations of main memory that were associated with the first row. In other words, the second row of the memory device now serves as the cache line for the memory locations of the main memory that were previously associated with the first row. Further, the dynamic row decoder may disable the first row of the memory device by, for instance, write to a corresponding bit in a register (e.g., writing a one to a corresponding reserve bit of a register). As such, the first row is disabled (e.g., prevented, blocked) from being written to.

In some examples, the dynamic row decoder may, upon receiving the error signal from the data decoder, read a total error count (e.g., global ECC error count) from the data decoder (e.g., from a register maintained by the data decoder). For example, the data decoder may include a register that maintains a total error count (e.g., global ECC error count) that is accessible by the dynamic row decoder. In some examples, rather than, or in addition to, relying on the error signal from the data decoder, the dynamic row decoder reads the total error count occasionally (e.g., periodically). For instance, the dynamic row decoder may read the total error count from the data decoder every millisecond.

The dynamic row decoder may compare the total error count to a threshold error count and, based on the comparison, may determine a row of the memory device associated with a greatest row error count. For example, the dynamic row decoder may determine, based on the comparison, whether the total error count is less than, or the same as or greater than, the threshold error count. In some examples, if the total error count is not the same or greater than the threshold error count, the dynamic row decoder may clear (e.g., zero out) the total error count and all of the error count memory locations of the row error counts buffer.

If, however, the total error count is the same or greater than the threshold error count, the dynamic row decoder may determine which of the error count memory locations of the row error counts buffer has the greatest error count, and may determine the first row of the memory device corresponding to the greatest error count, as described herein.

In some examples, the dynamic row decoder may further include a blacklist buffer. The blacklist buffer may include data identifying a memory row of the memory device that has been disabled. For example, the dynamic row decoder may write data to the blacklist buffer identifying a row of the memory device that has been disabled as described herein. The blacklist buffer may identify any number of rows that have been disabled. In some instances, the dynamic row decoder maintains the rows identified in the blacklist buffer disabled for at least a minimum amount of time. For example, the data written to the blacklist buffer may include an identification of a row and a timestamp of when the row was disabled. The dynamic row decoder may compare the timestamp of each row to a current timestamp to determine if the minimum amount of time has expired. If the minimum amount of time has expired, the dynamic row decoder may remove the row from the blacklist buffer (e.g., zero out the data within the blacklist buffer corresponding to the row), and may enable the memory row (e.g., by writing to the corresponding bit in a register (e.g., writing a zero to the corresponding reserve bit of a register).

Among other advantages, the embodiments may reduce data errors within memory devices, and may improve the performance and the data integrity of these memory devices (e.g., cache memories). The embodiments may also reduce costs, such as by reducing the chances or frequency of replacing defective memory devices, among other advantages. Persons of ordinary skill in the art may recognize these and other advantages as well.

Turning to FIG. 1, integrated circuit 100 includes input buffer logic 102, dynamic row decoder logic 104, a memory array logic 106, column decoder logic 108, data encoder logic 110, data decoder logic 112, and input/output (I/O) control logic 114. The integrated circuit 100 may be employed within any suitable die architecture, such as within a graphical processing unit (GPU), a central processing unit (CPU), a microcontroller, a memory controller, or any other suitable integrated circuit or die architecture.

Memory array logic 106 may be any suitable memory array, such as an SRAM device implementing a data cache (e.g., L1 or L2 data cache). For example, memory array logic 106 may be a 512K by 32 bit RAM array. Memory array logic 106 may include a memory array that can store data at corresponding memory locations, where each memory location can be accessed at a corresponding row and column of the memory array. Input buffer logic 102 is configured to receive address data 101 characterizing a memory address of memory array logic 106. For example, input buffer logic 102 may receive the address data 101 via one or more address lines (e.g., 19 address lines), where the address data 101 identifies a memory location of the memory array logic 106 to write to or read from. Input buffer logic 102 may temporarily hold (e.g., store) the address data 101 before passing the address data 101 to the column decoder logic 108 and the dynamic row decoder logic 104.

I/O control logic 114 is coupled to I/O signals 120, which may include data and/or control signals. For instance, the I/O signals 120 may include data signals provided over corresponding data lines, and control signals provided over control lines. The data signals may define data to be written to memory array logic 106 (e.g., during a write operation), or data read from memory array logic 106 (e.g., during a read operation). The data may be written to, or read from, a memory location of the memory array logic 106 as defined by the address data 101. The control signals may include, for instance, a write enable signal and one or more byte enable signals, for one or more bytes of the data to be read or written.

For a write operation (i.e., writing data to the memory array of memory array logic 106), I/O control logic 114 may provide data 115, obtained from the I/O signals 120, to data encoder logic 110. Data encoder logic 110 may receive the data 115, and may generate one or more ECCs (e.g., one per byte of data, etc.) based on the data 115. Further, data encoder logic 110 may provide encoded data 111, which includes the data 115 and the generated ECCs, to the memory array logic 106 for storing within a memory location of the memory array of memory array logic 106 (i.e., the memory location selected by the row selection signal 105 and column selection signal 111 as described below).

For a read operation (i.e., reading data from the memory array of memory array logic 106), I/O control logic 114 may receive data 113 from data decoder 112. For example, data decoder logic 112 may receive encoded data 107 from memory array logic 106. The encoded data 107 may correspond to data read from a memory location of the memory array of memory array logic 106 (i.e., the memory location selected by the row selection signal 105 and column selection signal 111 as described below), and may include data and one or more ECCS (e.g., as generated and stored by data encoder logic 110). Additionally, data decoder logic 112 may generate one or more ECCs (e.g., one per byte of data) based on the data portion of encoded data 107, and may compare the generated ECCs to the ECCs received with the encoded data 107. If ECCs corresponding to the same data (e.g., the same data byte) do not match, data decoder logic 112 may generate an ECC error, and store the ECC error within a register. For example, data decoder logic 112 may increment an ECC error count within a register based on the detected error. Data decoder logic 112 may further determine the type of error, and may store data characterizing the type of error within a register. For instance, data decoder logic 112 may store, within the register, a first value (e.g., 0b000) if there is no error, a second value (e.g., 0b001) if there is a single error correction (SEC) error, a third value (e.g., 0b010) for a double error detection (DED), and a third value (e.g., 0b100) if there is a check bit error. As described herein, data decoder logic 112 may generate a signal (e.g., interrupt) when an ECC error is detected. Data decoder logic 112 may also determine when the ECC error count reaches a threshold (e.g., 15), and may generate a signal based on the determination.

The column decoder logic 108 is configured to receive the address data 101 and, based on the address data 101, generate a column selection signal 109 that identifies a column of the memory array logic 106. For instance, column decoder logic 108 may determine a column of the memory array logic 106 based on one or more address signals provided by the address data 101, and may generate the column selection signal 109 based on the determined column. Memory array logic 106 is configured to receive the column selection signal 109, and select a column of its memory array based on the column selection signal 109.

The dynamic row decoder 104 is configured to receive the address data 101 and, based on the address data 101, generate a row selection signal 105 that identifies a row of the memory array logic 106. As described herein, dynamic row decoder logic 104 may maintain an error count (e.g., an ECC error count) for each row of the memory array of the memory array logic 106. For example, data decoder logic 112 is coupled to dynamic row decoder logic 104. When data decoder logic 112 detects an ECC error (e.g., during a read operation), data decoder logic 113 may transmit a signal to dynamic row decoder logic 104 indicating the error. In response, dynamic row decoder logic 104 may increment the error count for a row of the memory array of the memory array logic 106 (e.g., the row corresponding to the row selection signal 105). Dynamic row decoder logic 104 may also maintain an access count for each row of the memory array of the memory array logic 106. For example, for a given read or write operation, dynamic row decoder logic 104 may increment the access count for the row corresponding to the row selection signal 105 that selects the row of the memory array for the read or write operation.

Further, and as described herein, dynamic row decoder logic 104 may maintain a history of the memory rows of the memory array that have been accessed (e.g., read from or written to). For instance, when dynamic row decoder logic 104 receives address data 101 from input buffer 102, dynamic row decoder logic 104 may write data to an access history buffer that identifies the memory row being accessed and, in some examples, a corresponding time stamp. The access history buffer may be a circular buffer that maintains data for a predetermined number of memory array accesses.

In some examples, the dynamic row decoder logic 104 may, upon receiving the ECC error signal from the data decoder logic 112, determine a first row of the memory array corresponding to the greatest error count. Dynamic row decoder logic 104 may also determine a second row of the memory array based on the data stored within the access history buffer. For example, the dynamic row decoder logic 104 may determine a second row of the memory device that has been less recently accessed (e.g. the least recently accessed row) than the first row based on the data stored within the access history buffer. In some examples, the dynamic row decoder logic 104 may determine a second row of the memory device that has been accessed less often (e.g., the least often) than the first row based on the data stored within the access history buffer. In some examples, the dynamic row decoder logic 104 may determine a second row of the memory device that has had less errors (e.g., the least errors) than the first row based on the error counts corresponding to the memory rows of the memory array.

After the second row has been determined, the dynamic row decoder logic 104 may read the data stored in the first row of the memory array, and may write the data to the determined second row of the memory array. As such, the second row of the memory array is now associated with the memory locations of main memory that were associated with the first row. In other words, the second row of the memory device now serves as the cache line for the memory locations of the main memory that were previously associated with the first row. Further, the dynamic row decoder may disable the first row of the memory device (e.g., by clearing a corresponding enable bit of an enable register). As such, the first row is disabled (e.g., prevented, blocked) from being written to.

In some examples, the dynamic row decoder logic 104 may, upon receiving the ECC error signal from the data decoder logic 112, read a total error count (e.g., global ECC error count) from the data decoder logic 112 (e.g., from a register maintained by the data decoder logic 112). The dynamic row decoder logic 104 may compare the total error count to a threshold error count (e.g., maintained within a local register) and, based on the comparison, may determine a row of the memory array of the memory array logic 106 associated with a greatest row error count. For example, dynamic row decoder logic 104 may determine, based on the comparison, whether the total error count is less than, or the same as or greater than, the threshold error count.

If the total error count is less than the threshold error count, the dynamic row decoder logic 104 may clear (e.g., zero out) the total error count and all of the error counts corresponding to the memory rows of the memory array. In some examples, dynamic row decoder logic 104 reads the total error count occasionally (e.g., periodically), and clears the total error count and the error counts corresponding to the memory rows of the memory array when the total error count is less than the threshold error count.

If, however, the total error count is the same or greater than the threshold error count, the dynamic row decoder logic 104 may determine the greatest error count from the error counts corresponding to the memory rows of the memory array, as described herein.

The dynamic row decoder logic 104 may also include a blacklist buffer that includes data identifying a memory row of the memory array that has been disabled. For example, dynamic row decoder logic 104 may write data to the blacklist buffer identifying a row of the memory array that has been disabled as described herein. The blacklist buffer may identify any number of rows that have been disabled. In some instances, dynamic row decoder logic 104 maintains the rows identified in the blacklist buffer disabled for at least a minimum amount of time. For example, the data written to the blacklist buffer may include an identification of a row and a timestamp of when the row was disabled. The dynamic row decoder logic 104 may compare the timestamp of each row to a current timestamp to determine if the minimum amount of time has expired. If the minimum amount of time has expired, dynamic row decoder logic 104 may remove the row from the blacklist buffer (e.g., zero out the data within the blacklist buffer corresponding to the row), and may re-enable the memory row (e.g., by setting the corresponding enable bit of the enable register).

Figure 2:
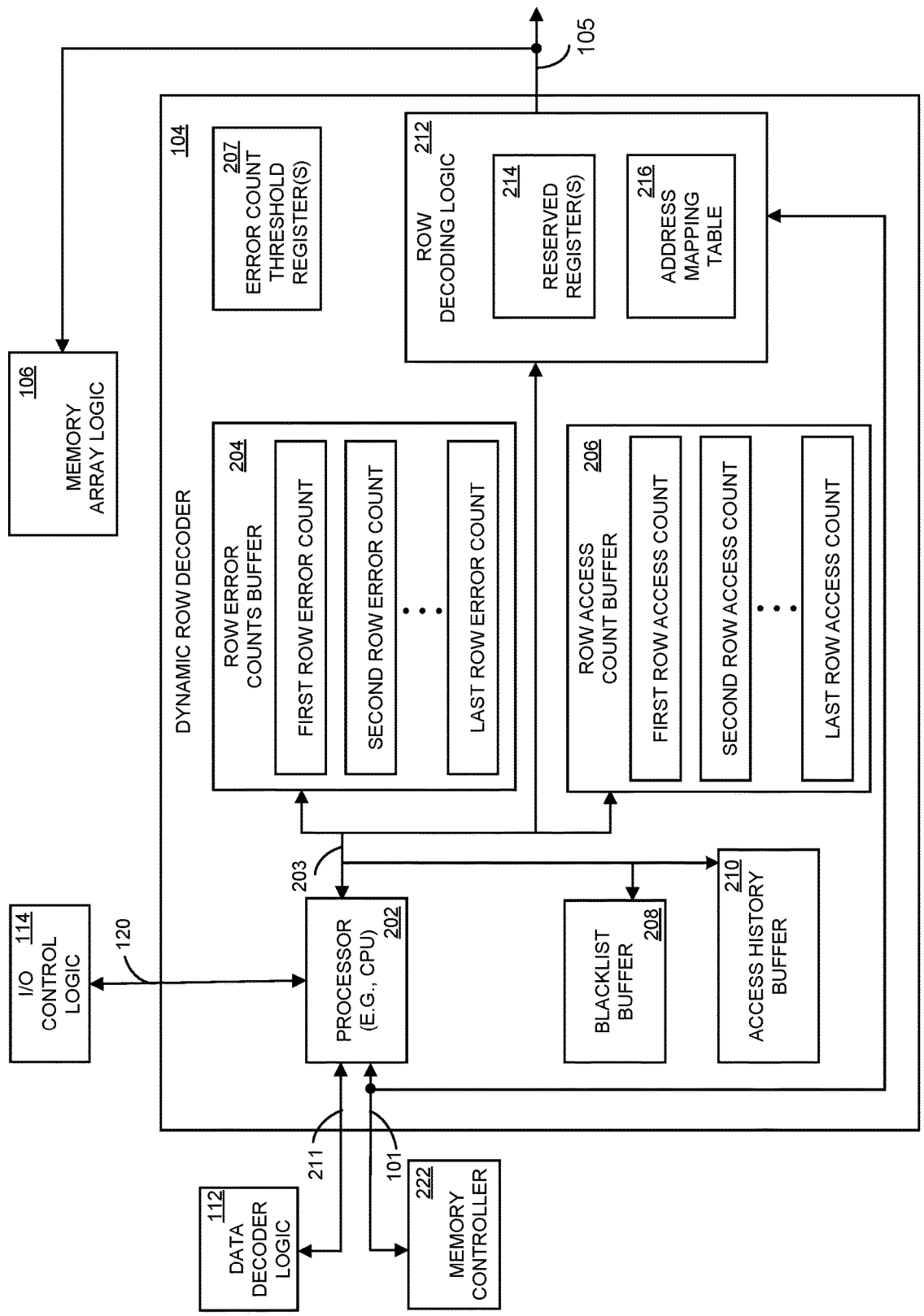
FIG. 2 is block diagram of another integrated circuit, according to some implementations.

FIG. 2 illustrates, among other things, an exemplary dynamic row decoder logic 104. As illustrated, the dynamic row decoder logic 104 includes a processor 202, a row error counts buffer 204, one or more error count threshold registers 207, a row access count buffer 206, a blacklist buffer 208, an access history buffer 210, as well as row decoding logic 212. Processor 202 may include one or more processing cores. For instance, processor 202 may be a graphical processing unit (GPU), a central processing unit (CPU), a microcontroller, or any other suitable processing device. Further, processor 202 is communicatively coupled to the row error counts buffer 204, the error count threshold registers 207, the row access count buffer 206, the blacklist buffer 208, the access history buffer 210, and the row decoding logic 212 over communication bus 203. As illustrated, processor 202 may also be coupled to a memory controller 222, and may receive the address data 101 from the memory controller 222. For instance, the memory controller 222 may be configured to service memory requests (e.g., read and/or write requests from other components and/or devices) to memory array logic 106.

Processor 202 is also coupled to I/O control logic 114 over I/O signals 120. For instance, processor 202 may provide data to the I/O signals 120 for writing the data to the memory array of the memory array logic 106. Similarly, processor 202 may receive data read from the memory array of the memory array logic 106 over the I/O signals 120. Further, processor 202 is coupled to data decoder logic 112 over one or more communication buses 211. For instance, processor 202 may read from, or write to, data decoder logic 112 registers using one or more communication buses 211. Processor 202 may also receive one or more signals, such as an interrupt, from data decoder logic 112 over the one or more communication buses 211.

Row decoding logic 212 is configured to receive address data 101 and, based on the address data 101, generate the row selection signal 105 that identifies a row of the memory array of the memory array logic 106. For instance, row decoding logic 212 may determine a row of the memory array based on the address identified by the address data 101. In some instances, row decoding logic 212 maintains an address mapping table 216 (e.g., within memory) that maps memory addresses (e.g., memory address ranges) to the rows of the memory array. For example, row decoding logic 212 may determine a memory row of the memory array corresponding to the address identified by the address data 101 based on the address mapping table 216.

Row decoding logic 212 may further include one or more reserved registers 214. A reserved register 214 may allow for the enabling, or disabling, of access to the rows of the memory array of the memory array logic 106. For example, each bit of a reserved register 214 may correspond to a row of the memory array and, based on its setting, configures whether the corresponding row is accessible. Processor 202 may enable or disable rows of the memory array by writing to the reserved register 214. For instance, if processor 202 sets a bit of the reserved register 214 to a first level (e.g., 0), the corresponding row of the memory array becomes disabled. If processor 202 sets the bit to a second level (e.g., 1), the corresponding row becomes enabled. If a row is disabled, row decoding logic 105 is prevented from generating a row selection signal 105 that selects the disabled row.

Further, row error counts buffer 204 maintains an error count for each row (e.g., cache line) of the memory array of the memory array logic 106. For instance, first row error count 204A may indicate an error count (e.g., ECC error count) of a first row of the memory array. Similarly, second row error count 204B may indicate an error count of a second row of the memory array, and last row error count 204C may indicate an error count of the last row of the memory array. Row error counts buffer 204 may include additional error counts for additional rows of the memory array. The error count memory locations of the row error counts buffer 204 may be mapped to the rows of the memory array based on a hashing filter, such as a Bloom Count Filter (BCF).

As described herein, processor 202 may write to the row error counts buffer 204 to update one or more of the error counts. For instance, processor 202 may receive an interrupt signal from data decoder logic 112 over a communication bus 211 indicating an ECC error. Processor 202 may also receive, from row decoding logic 212, the row selection signal 105 indicating a row of the memory array to read. Based on the row selection signal 105, processor 202 may determine a row of the memory array that triggered the ECC error, and may update the error count (e.g., first row error count 204A) for the corresponding row in the row error counts buffer 204. In some instances, processor 202 determines the row of the memory array that triggered the ECC error based on the memory address identified by the address data 101.

Row access count buffer 206 maintains an access count for each row of the memory array of the memory array logic 106. For instance, first row access count 206A may indicate an access count (e.g., a number of reads) for the first row of the memory array. Similarly, second row access count 206B may indicate an access count of a second row of the memory array, and last row access count 206C may indicate an access count of the last row of the memory array. Row access counts buffer 206 may include additional access counts for additional rows of the memory array. As described herein, processor 202 may write to the row access count buffer 206 to update one or more of the access counts. Processor 202 may write to the row access count buffer 206 to update one or more of the access counts. For example, processor 202 may receive, from row decoding logic 212, row selection signal 105 indicating a row of the memory array to read. Based on the row selection signal 105, processor 202 may determine a corresponding row of the row access count buffer 206, and may increment an access count (e.g., first row access count 206A) for the corresponding row of the row access count buffer 206.

Dynamic row decoder logic 104 may further include an access history buffer 210. The access history buffer 210 may be a circular buffer residing in an SRAM, for example. For each request received, processor 202 may write data characterizing a memory address identified by address data 101 to access history buffer 210. For example, processor 202 may write at least a portion of a memory address identified by address data 101 to the access history buffer 210. The portion of the memory address written to the access history buffer 210 may be sufficient to identify a corresponding row of the memory arrow of the memory array logic 106 to which the address data 101 pertained (e.g., a sufficient number of the address bits, such as four, five, six, or any other number of upper, or lower, address bits). Processor 202 may further write a timestamp associated with each request to the access history buffer 210. For example, upon receiving address data 101, processor 202 may determine a timestamp, and may write the timestamp along with the data characterizing the corresponding memory address to the access history buffer 210.

Additionally, processor 202 may, upon receiving an ECC error signal from the data decoder logic 112 over communication bus 211, determine a first row of the memory array of the memory array logic 106 that is associated with a greatest row error count based on the counts stored in the row error counts buffer 204. Processor 202 may also determine another row of the memory array based on the data stored within the access history buffer 210. For example, processor 202 may determine a row of the memory array that has been less recently accessed than the first row based on the data stored within the access history buffer 208. For example, processor 202 may locate the most recent entry for the first row, and may then identify an entry for another row that indicates that the row was accessed less recently than the first row. In some examples, processor 202 may determine a second row of the memory array that has been accessed less often than the first row based on the data stored within the access history buffer 208. For example, the processor 202 may determine a number of entries for each of the rows of the memory array. The processor 202 may then determine the least accessed row other than the first row from the computed number of entries. In some examples, processor 202 may determine a second row of the memory array that has had less errors than the first row based on the error counts corresponding to the memory rows of the memory array stored in the row error counts buffer 204.

In some examples, processor 202 may, upon receiving the ECC error signal from the data decoder logic 112 over communication bus 211, read a total error count (e.g., global ECC error count) from the data decoder logic 112 (e.g., from a register maintained by the data decoder logic 112). Processor 202 may compare the total error count to a threshold error count maintained within an error count threshold register 207. If the total error count is the same as or greater than the threshold error count, processor 202 may determine the first row of the memory array of the memory array logic 106 that is associated with the greatest row error count based on the counts stored in the row error counts buffer 204, as described herein.

Further, processor 202 may read the data stored in the first row of the memory array of the memory array logic 106, and may write the data to the determined second row of the memory array. As such, the second row of the memory array is now associated with memory locations that were associated with the first row. In other words, the second row of the memory array can now serve as the cache line for the memory locations that were previously associated with the first row. Further, processor 202 may disable the first row of the memory array by writing to a corresponding enable bit of the reserved register 214 within row decoding logic 212. As such, the first row is prevented from being written to.

Additionally, the dynamic row decoder logic 104 includes a blacklist buffer 208 that stores data identifying any memory rows of the memory array that have been disabled. For example, processor 202 may write data to the blacklist buffer 208 identifying a row of the memory array of the memory array logic 106 that has been disabled (e.g., by writing to the reserved register 214 of row decoding logic 212). The blacklist buffer 208 may identify any number of rows that have been disabled. In some instances, processor 202 maintains the rows identified in the blacklist buffer disabled for at least a minimum amount of time. For example, the data written to the blacklist buffer 208 may include an identification of a row and a timestamp of when a row of the memory array was disabled. Processor 202 may, occasionally, compare the timestamp of each row identified in the blacklist buffer 208 to a current timestamp to determine if the minimum amount of time has expired. If the minimum amount of time has expired, processor 202 may delete the row from the blacklist buffer 208, and may re-enable the memory row (e.g., by setting the corresponding enable bit of the reserved register 214).

Figure 3:
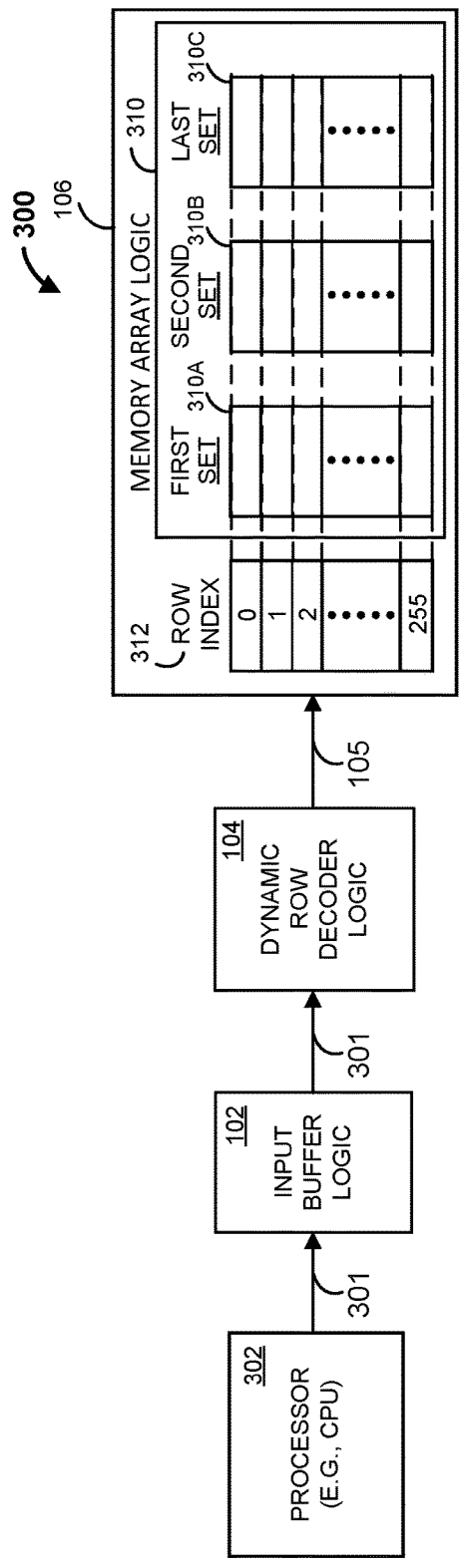
FIGS. 3 and 4 are block diagrams of portions of integrated circuits, according to some implementations.

FIG. 3 illustrates portions of an exemplary integrated circuit 300 that includes, within memory array logic 106, a memory array 310 that, for instance, may serve as a cache memory for a processor 302. As illustrated, the memory array 310 includes multiple memory rows identified by a corresponding row index 312. The memory array 310 also includes multiple columns (e.g., sets) including a first column 310A, a second column 310B, and a last column 310C. Each memory row may include a memory location at one or more columns of the memory array 310. For example, the memory row identified by row index 312 one includes a memory location at each of the first column 310A, the second column 310B, and the last column 310C.

In this example, input buffer 102 receives, from processor 302, address data 301 characterizing a memory address of the memory array 310. For instance, processor 302 may be reading from, or writing to, an original memory address that is cached to the memory array 310. Processor 302 (e.g., a memory controller of or serving processor 302) may generate the address data 301 characterizing the memory address of the memory array 310 that serves as a cache to the original requested memory address. The input buffer 102 may provide the address data 301 to dynamic row decoder logic 104 and to column decoder logic 108. Based on the address data 301, the dynamic row decoder logic 104 determines a row of the memory array 310 to select, and generates the row selection signal 105 to select the determined memory array row. Similarly, based on the address data 301, the column decoder logic 108 determines a column of the memory array 310 to select, and generates the column selection signal 109 to select the determined memory array column. Based on the row selection signal 105 and the column selection signal 109, the memory array logic 106 may read data from, or write data to, one or more of the selected memory locations.

As described herein, in some instances the data written in a particular memory row may be written to another memory row, such as a least recently accessed memory row. For example, the data located at memory row index 0 for each of first set 310A, second set 310B, and last set 310C may be written to memory row index 2 at first set 310A, second set 310B, and last set 310C, respectively, when errors (e.g., ECC errors) associated with memory row index 0 are determined to be greater than errors associated with each other memory row, and memory row index 2 is the least recently accessed memory row of memory array 300.

Figure 4:
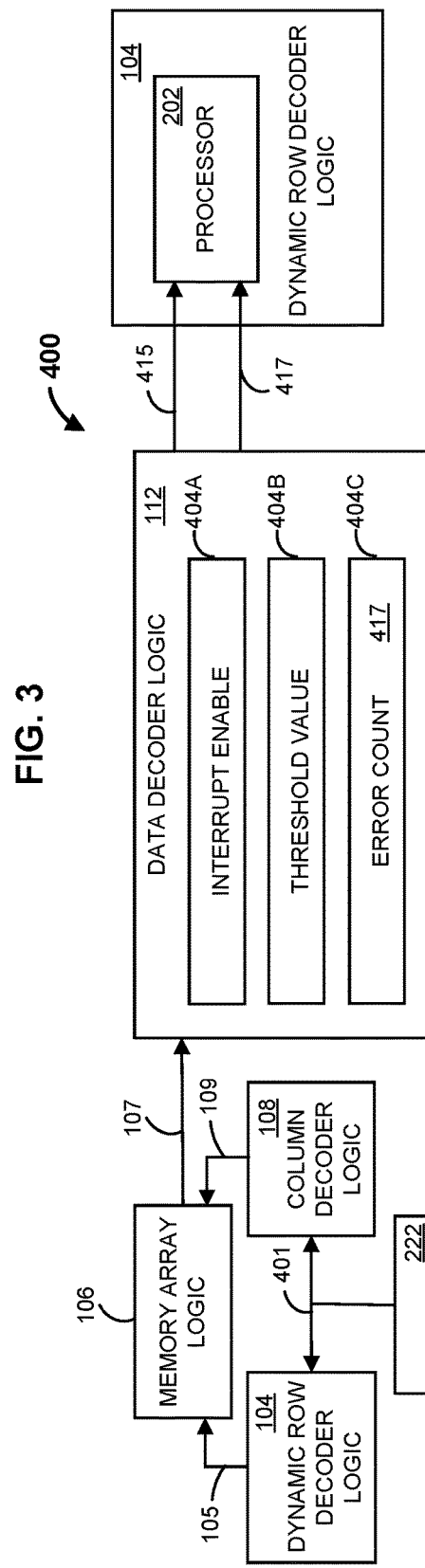

FIG. 4 illustrates portions of an exemplary integrated circuit 400. As illustrated, data decoder logic 112 includes an interrupt enable register 404A, a threshold value register 404B, and an error count register 404C. The error count register 404C may store a value characterizing a number of errors, such as ECC errors. As described herein, data decoder logic 112 may update (e.g., increment) the error count (e.g., global ECC error count) within the error count register 404C when a generated ECC and an ECC read from the memory array do not match. Further, the threshold value register 404B may store a threshold error value. When the error count within the error count register 404C meets or exceeds the threshold value within the threshold value register 404B, the data decoder logic 112 may generate an interrupt signal 415 that may be received by processor 202 of the dynamic row decoder logic 104.

Further, processor 202 may write or read from data decoder logic 112 registers, including the interrupt enable register 404A, the threshold value register 404B, and the error count register 404C. For instance, processor 202 may enable an interrupt signal from the data decoder logic 112 by writing to the interrupt enable register 404A. Data decoder logic 112 may generate the interrupt signal when the error count within the error count register 404C meets or exceeds the threshold value within the threshold value register 404B. Processor 202 may also write a threshold value to the threshold value register 404B to establish the threshold error value at which the interrupt is generated. Processor 202 may further read the error count from the error count register 404C, for example, in response to receiving the interrupt signal from the data decoder logic 112, or may read the error count occasionally (e.g., periodically).

In this example, a processor 402 generates a read request 403 that is received by the memory controller 222. Based on the read request, the memory controller generates address data 401 characterizing a memory address of the memory array of the memory array logic 106. Further, dynamic row decoder logic 104 receives the address data 401 from the memory controller 222, and generates the row selection signal 105 selecting a row of the memory array. Similarly, column decoder logic 108 receives the address data 401 from the memory controller 222, and generates the column selection signal 109 selecting one or more columns of the memory array. The memory array logic 106 receives the row selection signal 105 and the column selection signal 109 and determines one or more memory locations of the memory array to read data from. The memory array logic 106 obtains stored data 107 from the selected memory locations, and provides the stored data 107 to the data decoder logic 112. As described herein, the stored data 107 may include data (e.g., user data) and corresponding ECCs.

Further, the data decoder logic 112 may generate one or more ECCs based on the data portion of the stored data 107, and may compare the one or more generated ECCs to the one or more ECCs of the stored data 107. If one or more of the generated ECCs do not match with the corresponding one or more ECCs of the stored data, the data decoder logic 112 may increment the error count within the error count register 404C. Further, the data decoder logic 112 may compare the error count of the error count register 404C with the threshold value within the threshold value register 404B. If the error count meets or exceeds the threshold value, the data decoder logic 112 may generate an interrupt signal 415, which may be received by processor 202 of the dynamic row decoder logic 104. In response to receiving the interrupt signal 415, processor 202 may perform operations to disable a corresponding row of the memory array, and may write the data from the disabled row of the memory array to a second row of the memory array. As a result, the second row of the memory array will serve as the cache line for the memory addresses previously served by the disabled row of the memory array.

In some examples, in response to receiving the interrupt signal 415, processor 202 may read the error count register 404C from the data decoder logic 112 and receive the stored error count 417. As described herein, based on the stored error count 417 (e.g., when the stored error count 417 meets or exceeds a threshold error count), processor 202 may perform operations to disable a corresponding row of the memory array. Further, processor 202 may write the data from the disabled row of the memory array to a second row of the memory array to allow the second row to serve as the cache line for the memory addresses previously served by the disabled row of the memory array.

FIGS. 5A, 5B, 5C, and 5D illustrate a memory array 510 with multiple memory locations, each location including tag information and user data. For instance, and with reference to FIG. 5A, memory array 510 includes a first memory location 510A at a first row, a second memory location 510B at a second row, a third memory location 510C at a third row, a fourth memory location 510D at a fourth row, and a fifth memory location 510E at a fifth row. Each of these memory locations may include tag information as well as user data. For instance, the second memory location 510B includes tag data 511 and user data 513. The tag data 511 may identify an address of a memory location of a main memory that the memory array 510 serves as a cache for.

Further, as illustrated, a memory address 501 is received by the dynamic row decoder 104. Based on the memory address 501, the dynamic row decoder 104 determines a row of the memory array 510. In this example, the dynamic row decoder 104 generates a row selection signal (e.g., row selection signal 105) to select the second memory location 510B of the memory array 510.

In some examples, as described herein, the dynamic row decoder 104 may write the information stored at a first memory location of the memory array 510 to a second memory location of the memory array 510. For example, if an ECC count for the first memory row exceeds a threshold value, the dynamic row decoder 104 may determine a second row, such as a least recently used memory row, of the memory array 510 (e.g., based on data stored within the access history buffer 210), and may write the information stored at the first memory location of the memory array 510 to the second memory location.

Figures 5A, 5B, 5C, 5D:
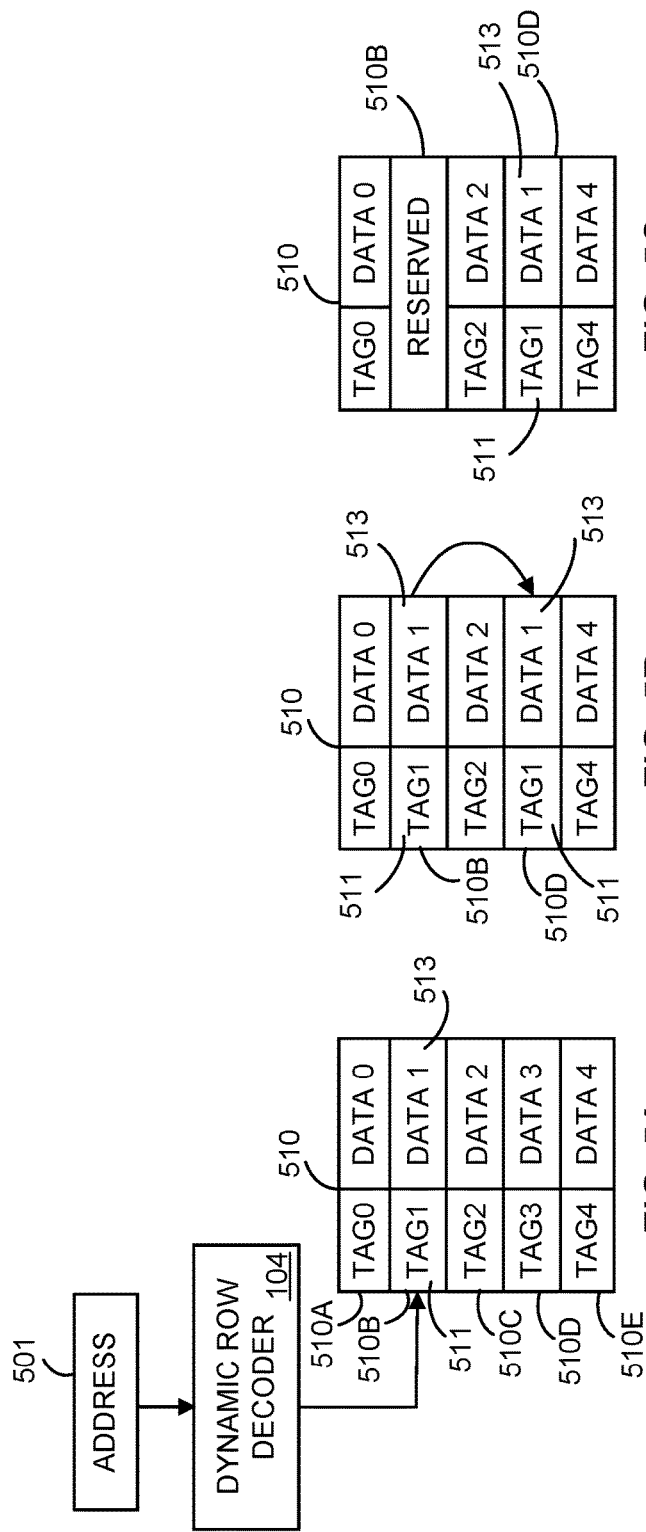
FIGS. 5A, 5B, 5C, and 5D illustrate data stored within memory devices, according to some implementations.

For instance, in FIG. 5A, the second memory location 510B stores "TAG1" tag data and "DATA 1" user data. The fourth memory location 510D stores "TAG3" tag data and "DATA 3" user data. Assuming an error count for the second memory location 510B (e.g., as indicated in the row error counts buffer 204) is at or above the threshold value, the dynamic row decoder 104 may write the "TAG1" tag data and "DATA 1" user data stored in the second memory location 510B to another memory location of the memory array 510, such as the fourth memory location 510D, as illustrated in FIG. 5B.

Further, and as illustrated in FIG. 5C, the dynamic row decoder 104 may disable the second memory row that includes the second memory location 510B (e.g., by writing to the reserved register 214), thereby causing the second memory row memory locations, including second memory location 510B, to be reserved. As such, memory addresses (e.g., main memory addresses) for which the second memory row previously served as a cache line for are now served by the fourth memory row. For example, and as illustrated in FIG. 5D, when the address 501 is received by the dynamic row decoder 104, the dynamic row decoder 104 generates a row selection signal that selects the fourth memory location 510D.

Figure 6:
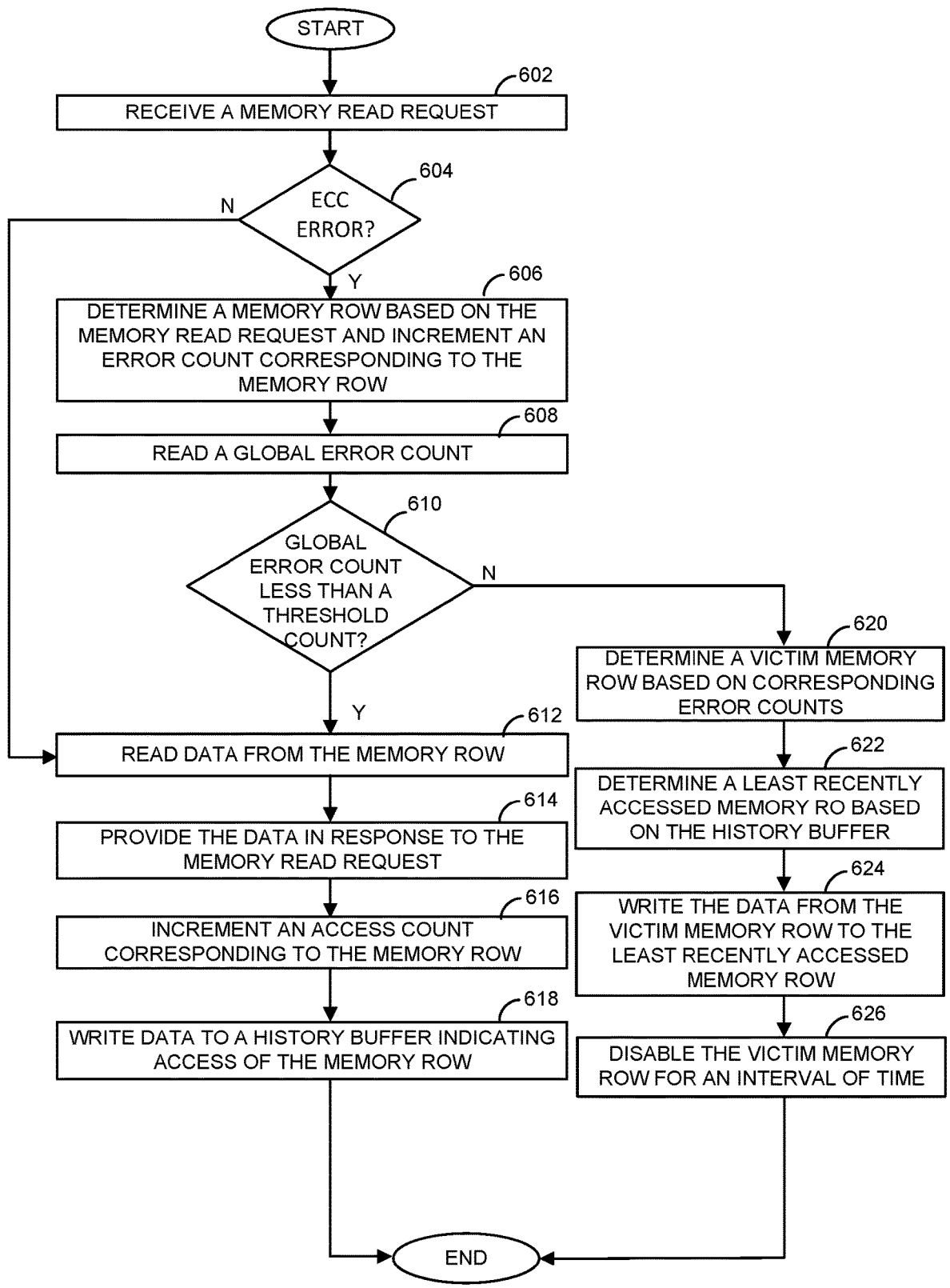
FIG. 6 is a flowchart of an exemplary process for improving data integrity within electronic component assemblies, according to some implementations.

FIG. 6 is a flowchart of an exemplary process 600 for improving data integrity within electronic component assemblies, and may be carried out by the die architectures described herein. For example, the dynamic row decoder 104 of the integrated circuit of FIG. 1 may perform one or more of the operations of exemplary process 600.

Beginning at block 602, a memory read request is received. For example, the dynamic row decoder 104 may receive a request to read data from the memory array of the memory array logic 106. The request may include address data 101 identifying the memory address of the memory array to read. At block 604, a determination is made as to whether an ECC error was detected for the memory read request. For example, if data decoder logic 112 detects an ECC error as described herein, the data decoder logic 112 may transmit a signal to the dynamic row decoder 104 indicating the error. Thus, if a signal is received from the data decoder logic 112 (e.g., within a predetermined amount of time), an ECC error has been detected. Otherwise, no ECC error is detected. If no ECC error is detected, the method proceeds to block 612.

At block 612, data is read from the memory row. For example, the memory array logic 106 may receive a row selection signal 105 from the dynamic row decoder logic 104, and a column selection signal 109 from the column decoder logic 108. The memory array logic 106 may provide data from a memory location of the memory array based on the selected row and column of the memory array. Further, at block 614, the read data is provided in response to the memory read request. For example, the I/O control logic 114 may provide the read data over the I/O signals 120, where the requesting component or device may receive the read data in response to the data read request. In addition, at block 616, an access count for the corresponding memory row is incremented. For instance, the dynamic row decoder 104 may increment the row access count (e.g., first row access count 206A) corresponding to the memory row within the row access count buffer 206. Furthermore, at block 618, data is written to a history buffer indicating access of the memory row. For example, the dynamic row decoder logic 104 may write data to the access history buffer 210 indicating access of a memory row of the memory array of memory array logic 106 corresponding to the memory address characterized by address data 101.

Back at block 604, if an ECC error has been detected, the method proceeds to block 606, where a memory row is determined based on the memory read request, and an error count corresponding to the memory row is incremented. The memory row may be a memory row of the memory array that corresponds to the memory address of the received memory read request. For example, the dynamic row decoder logic 104 may determine, based on a hash filter, a row error count of the row error counts buffer 204 that corresponds to the memory row, and may increment the determined error count (e.g., first row error count) within the row error counts buffer 204.

Further, at block 608, a global error count is read. For example, the dynamic row decoder logic 104 may read, from a register of the row decoding logic 212, a global ECC error count. The global error count may identify a number of ECC errors detected by the data decoder logic 112 over a time interval. At block 610, the global error count is compared to a threshold count to determine if the global error count is less than the threshold count. For example, the dynamic row decoder 104 may compare the global error count read from the data decoder logic 112 to a total threshold error value maintained within an error count threshold register 207. If the global error count is less than the threshold count, the method proceeds to block 612 where data is read from the selected memory locations of the memory row. At block 614, the data is provided in response to the data read request. For example, the I/O control logic 114 may provide the read data over the I/O signals 120, where the requesting component or device may receive the read data in response to the data read request. The method then proceeds to block 616, where the access count for the corresponding memory row is incremented. Further, at block 618, the data is written to the history buffer indicating access of the memory row.

Back at block 610, if the global error count is not less than the threshold count, the method proceeds to block 620 where a victim memory row is determined based on error counts corresponding to the memory rows of the memory array. For example, as described herein, the dynamic row decoder 104 may determine as the victim memory row the memory row corresponding to the greatest error count of the row error counts stored in the row error counts buffer 204. Further, at block 622, a least accessed memory row is determined based on the history buffer data. For example, the dynamic row decoder 104 may read an oldest (i.e., least recent) entry from the access history buffer 210, and may determine as the least accessed memory row the memory row corresponding to the oldest entry.

Further, and at block 624, data is read from the victim memory row, and is written to the least accessed memory row. For instance, and as described herein, the dynamic row decoder 104 may write data (e.g., tag data and user data) from the second memory location 510B at a second row of the memory array 510 to the fourth memory location 510D located at a fourth row of the memory array 510. Further, at block 626, the victim memory row is disabled for an interval of time (e.g., 10 milliseconds, 10 seconds, a minute, etc.). For example, the dynamic row decoder 104 may write to a corresponding bit of the reserved register 214 of the row decoding logic 212 to disable the victim memory row. After the interval of time has passed, the dynamic row decoder 104 may, in some examples, re-enable the victim memory row.

Figure 7:
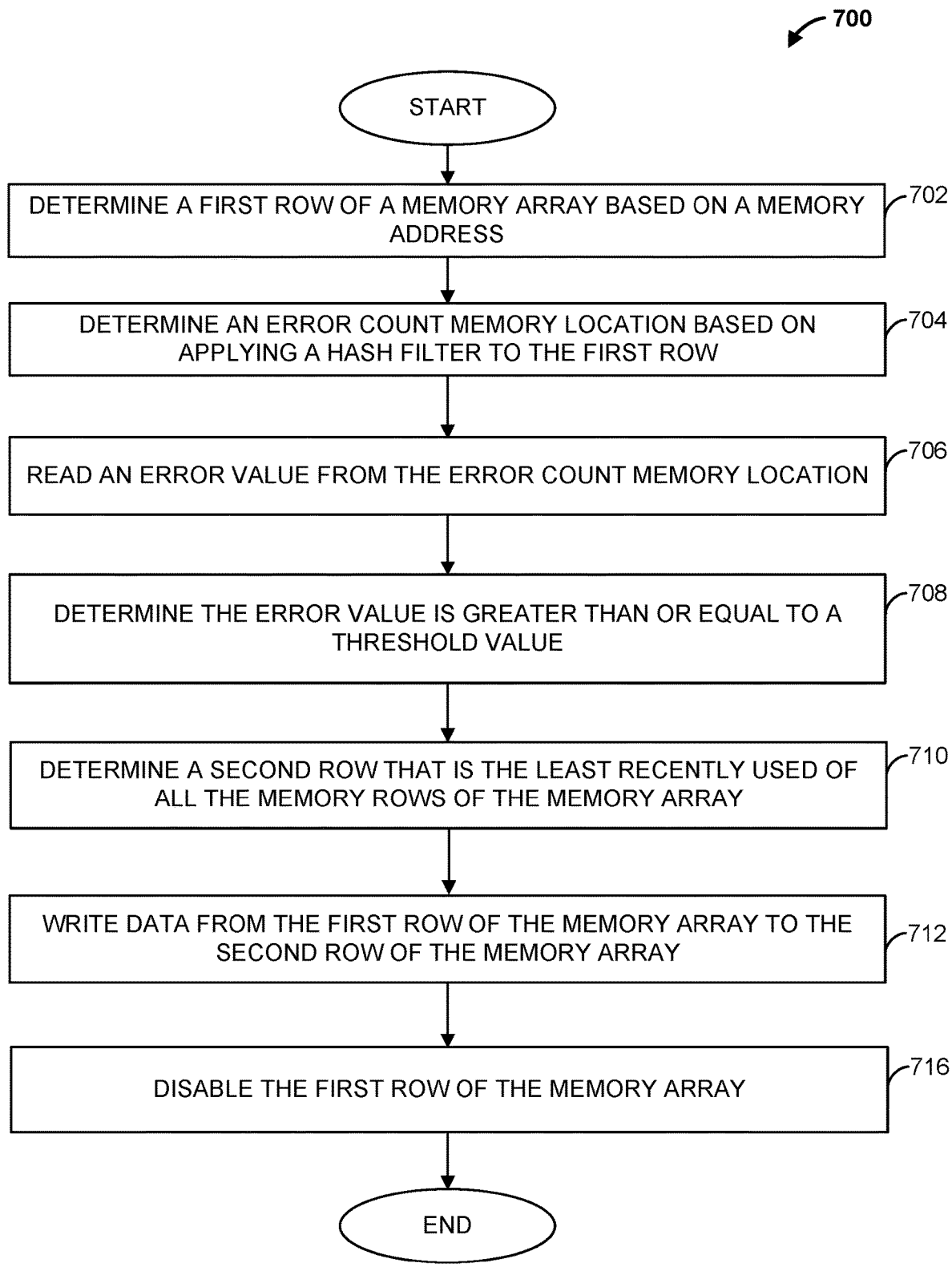
FIG. 7 is a flowchart of another exemplary process for improving data integrity within electronic component assemblies, according to some implementations.

FIG. 7 is a flowchart of an exemplary process 700 for improving data integrity within electronic component assemblies, and may be carried out by the die architectures described herein. For example, the dynamic row decoder 104 of the integrated circuit of FIG. 1 may perform one or more of the operations of exemplary process 700.

Beginning at block 702, a first row of a memory array is determined based on a memory address. For instance, and as described herein, the dynamic row decoder 104 may receive address data 101 characterizing a memory address, and may determine a memory row of the memory array of the memory array logic 106 based on the address data 101. Further, at block 704, an error count memory location is determined based on applying a hashing filter to data characterizing the first row. For example, the error count memory locations of the row error counts buffer 206 may be mapped to the rows of the memory array of the memory array logic 106 based on a hashing filter, such as a Bloom Count Filter (BCF). The dynamic row decoder 104 may apply the hashing filter to the determined row to determine the corresponding error count memory location of the row error counts buffer 206.

Further, at block 706, an error value is read from the error count memory location. For example, assuming the row data identifies the second row of the memory array, the dynamic row decoder 104 may read the second row error count 204B from the row error counts buffer 204. At block 708, a determination is made that the error value is greater than or equal to a threshold value. For example, the dynamic row decoder 104 may compare the row error count read from the row error counts buffer 204 to the threshold value stored in an error count threshold register 207. Based on the comparison, the dynamic row decoder 104 may determine that the row error count is greater than the threshold value, and thus that the memory row should be disabled, at least for a period of time.

The method then proceeds to block 710, where a second row that is the least recently accessed row of all the memory rows of the memory array is determined. For example, as described herein, the dynamic row decoder 104 may determine, based on data of the access history buffer 210, the least recently accessed row of the memory rows of the memory array of the memory array logic 106. In some examples, the dynamic row decoder 104 maintains within memory data characterizing a data pointer, where the data pointer points to a least recently updated location of the access history buffer 210. The dynamic row decoder 104 may determine the least recently accessed row based on the data pointer. In some examples, the access history buffer 210 may be a first-in-first-out (FIFO) buffer, and the dynamic row decoder 104 may determine the least recently accessed row of the memory array based on data stored in the last location of the FIFO.

Further, at block 712, where data is written from the first row of the memory array to the second row of the memory array. For instance, the dynamic row decoder 104 may write data (e.g., tag data and user data) from the second memory location 510B at a second row of the memory array 510 to the fourth memory location 510D located at a fourth row of the memory array 510. At block 714, the first row of the memory array is disabled. For example, the dynamic row decoder 104 may write to a corresponding bit of the reserved register 214 of the row decoding logic 212 to disable the first row of the memory array.

Implementation examples are further described in the following numbered clauses:

1. A die package comprising:
   a memory device; and
   a processor communicatively coupled to the memory device, the processor configured to:
   receive a signal indicating that decoding errors have been detected;
   in response to the signal, receive an error count corresponding to each of a plurality of memory rows of the memory device;
   determine a first memory row of the plurality of memory rows based on the error counts;
   determine a second memory row of the plurality of memory rows based on access data characterizing memory accesses of the plurality of memory rows; and
   write data stored at the first memory row to the second memory row of the memory device.

2. The die package of clause 1, wherein the processor is configured to disable the first memory row.

3. The die package of clause 2, wherein the processor is configured to enable the first memory row after a predetermined amount of time.

4. The die package of any of clauses 1-3, wherein the processor is configured to:
   determine a greatest error count from the error counts; and
   determine the first memory row based on the greatest error count.

5. The die package of any of clauses 1-4, wherein the processor is configured to receive the error count corresponding to each of the plurality of memory rows of the memory device from an error count buffer, wherein the error count buffer comprises an error count for each of the plurality of memory rows.

6. The die package of clause 5, wherein the processor is configured to determine a mapping of the error counts to the plurality of memory rows based on a hashing filter.

7. The die package of clause 6, wherein the processor is configured to:
   receive a memory address;
   receive a second signal indicating that an error correcting coder error has been detected;
   apply the hashing filter to the memory address to determine a corresponding row of the plurality of memory rows of the memory device; and
   increment the error count for the corresponding row of the plurality of memory rows.

8. The die package of any of clauses 1-7, wherein the processor is configured to:
   compare the error count for the first memory row to a threshold error count; and
   determine the error count is greater than or equal to the threshold error count.

9. The die package of any of clauses 1-8, wherein the processor is configured to:
   read the access data for each of the plurality of memory rows from an access buffer;
   determine, based on the access data, a least recent memory access of the plurality of memory rows; and
   determine the second memory row based on the least recent memory access.

10. The die package of clause 9, wherein the access buffer is a circular buffer, and wherein the processor is configured to determine the least recent memory access based on a position of the access data within the circular buffer.

11. The die package of any of clauses 1-10, wherein the data stored at the first memory row comprises tag data and user data.

12. The die package of any of clauses 1-11 comprising decoding logic, wherein the decoding logic is configured to generate the signal in response to determining a number of error correcting code errors over a time interval.

13. The die package of clause 12, wherein the decoding logic is configured to:
   compare the number of error correcting code errors to a threshold error value;
   determine, based on the comparison, that the number of error correcting code errors are greater than or equal to the threshold error value; and
   generate the signal in response to the determination.

14. A method by a processor comprising:
   receiving a signal indicating that decoding errors have been detected;
   in response to the signal, receiving an error count corresponding to each of a plurality of memory rows of a memory device;
   determining a first memory row of the plurality of memory rows based on the error counts;

determining a second memory row of the plurality of memory rows based on access data characterizing memory accesses of the plurality of memory rows; and writing data stored at the first memory row to the second memory row of the memory device.

15. The method of clause 14, further comprising disabling the first memory row.

16. The method of clause 15, further comprising enabling the first memory row after a predetermined amount of time.

17 The method of any of clauses 14-16, further comprising:

determining a greatest error count from the error counts; and determining the first memory row based on the greatest error count.

18. The method of any of clauses 14-17, further comprising receiving the error count corresponding to each of the plurality of memory rows of the memory device from an error count buffer, wherein the error count buffer comprises an error count for each of the plurality of memory rows.

19. The method of clause 18, further comprising determining a mapping of the error counts to the plurality of memory rows based on a hashing filter.

20. The method of clause 19, further comprising:

receiving a memory address;

receiving a second signal indicating that an error correcting coder error has been detected;

applying the hashing filter to the memory address to determine a corresponding row of the plurality of memory rows of the memory device; and incrementing the error count for the corresponding row of the plurality of memory rows.

21. The method of any of clauses 14-20, further comprising:

comparing the error count for the first memory row to a threshold error count; and determining the error count is greater than or equal to the threshold error count.

22. The method of clause 14, further comprising:

reading the access data for each of the plurality of memory rows from an access buffer;

determining, based on the access data, a least recent memory access of the plurality of memory rows; and determining the second memory row based on the least recent memory access, 23. The method of clause 22, wherein the access buffer is a circular buffer, the method further comprising determining the least recent memory access based on a position of the access data within the circular buffer.

24. The method of any of clauses 14-23, wherein the data stored at the first memory row comprises tag data and user data.

25. The method of any of clauses 14-24, further comprising generating the signal in response to determining a number of error correcting code errors over a time interval.

26. The method of clause 25, further comprising:

comparing the number of error correcting code errors to a threshold error value;

determining, based on the comparison, that the number of error correcting code errors are greater than or equal to the threshold error value; and generating the signal in response to the determination.

27. A non-transitory, machine-readable storage medium comprises instructions that, when executed by at least one processor, cause the at least one processor to:

receive a signal indicating that decoding errors have been detected;

in response to the signal, receive an error count corresponding to each of a plurality of memory rows of a memory device;

determine a first memory row of the plurality of memory rows based on the error counts;

determine a second memory row of the plurality of memory rows based on access data characterizing memory accesses of the plurality of memory rows; and write data stored at the first memory row to the second memory row of the memory device.

28. The non-transitory, machine-readable storage medium of clause 27 comprising instructions that, when executed by the at least one processor, cause the at least one processor to disable the first memory row.

29. The non-transitory, machine-readable storage medium of clause 28 comprising instructions that, when executed by the at least one processor, cause the at least one processor to enable the first memory row after a predetermined amount of time.

30. The non-transitory, machine-readable storage medium of any of clauses 27-29 comprising instructions that, when executed by the at least one processor, cause the at least one processor to:

determine a greatest error count from the error counts; and determine the first memory row based on the greatest error count.

31. The non-transitory, machine-readable storage medium of any of clauses 27-30 comprising instructions that, when executed by the at least one processor, cause the at least one processor to receive the error count corresponding to each of the plurality of memory rows of the memory device from an error count buffer, wherein the error count buffer comprises an error count for each of the plurality of memory rows.

32. The non-transitory, machine-readable storage medium of clause 31 comprising instructions that, when executed by the at least one processor, cause the at least one processor to determine a mapping of the error counts to the plurality of memory rows based on a hashing filter.

33. The non-transitory, machine-readable storage medium of clause 32 comprising instructions that, when executed by the at least one processor, cause the at least one processor to:

receive a memory address;

receive a second signal indicating that an error correcting coder error has been detected;

apply the hashing filter to the memory address to determine a corresponding row of the plurality of memory rows of the memory device; and increment the error count for the corresponding row of the plurality of memory rows.

34. The non-transitory, machine-readable storage medium of any of clauses 27-33 comprising instructions that, when executed by the at least one processor, cause the at least one processor to:

compare the error count for the first memory row to a threshold error count; and determine the error count is greater than or equal to the threshold error count.

35. The non-transitory, machine-readable storage medium of any of clauses 27-34 comprising instructions that, when executed by the at least one processor, cause the at least one processor to:

read the access data for each of the plurality of memory rows from an access buffer;

determine, based on the access data, a least recent memory access of the plurality of memory rows; and determine the second memory row based on the least recent memory access.

36. The non-transitory, machine-readable storage medium of clause 35, wherein the access buffer is a circular buffer, and comprising instructions that, when executed by the at least one processor, cause the at least one processor to determine the least recent memory access based on a position of the access data within the circular buffer.

37. The non-transitory, machine-readable storage medium of any of clauses 27-36 wherein the data stored at the first memory row comprises tag data and user data.

38. The non-transitory, machine-readable storage medium of any of clauses 27-37 comprising instructions that, when executed by the at least one processor, cause the at least one processor to generate the signal in response to determining a number of error correcting code errors over a time interval.

39. A die package comprising:
  decoding logic;
  a memory device; and
  a processor communicatively coupled to the decoding logic and the memory device, the processor configured to:
    receive, from the decoding logic, a signal indicating that decoding errors have been detected;
    in response to the signal, receive an error count corresponding to each of a plurality of memory rows of the memory device;
    determine a first memory row of the plurality of memory rows based on the error counts;
    determine a second memory row of the plurality of memory rows based on access data characterizing memory accesses of the plurality of memory rows;
    write data stored at the first memory row to the second memory row of the memory device; and
    disable the first memory row.

40. A die comprising:
  a row decoding logic coupled to a memory array and configured to:
    receive address data; and
    generate a row selection signal;
  a row error count buffer configured to maintain an error count for each row of the memory array; and
  a processor configured to write data stored at a first memory row of the memory array to a second memory row of the memory array.

41. The die of clause 40, wherein the processor is configured to:
  receive a signal indicating that decoding errors have been detected;
  in response to the signal, read an error count for each of row of the memory array from the row error count buffer;
  determine the first memory row of the memory array based on the error counts; and
  determine the second memory row of the memory array based on access data characterizing memory accesses of the rows of the memory array.

42. The die of clause 41 comprising decoding logic, wherein the decoding logic is configured to generate the signal in response to determining a number of error correcting code errors over a time interval.

43. The die of any of clauses 41-42, wherein the decoding logic is configured to:
  compare the number of error correcting code errors to a threshold error value;
  determine, based on the comparison, that the number of error correcting code errors are greater than or equal to the threshold error value; and
  generate the signal in response to the determination.

44. The die of clause 40, wherein the processor is configured to disable the first memory row.

45. The die of any of clauses 40-44, wherein the processor is configured to enable the first memory row after a predetermined amount of time.

46. The die of any of clauses 40-45, wherein the processor is configured to:
  determine a greatest error count from the error counts; and
  determine the first memory row based on the greatest error count.

47 The die of any of clauses 40-46, wherein the processor is configured to determine a mapping of the error counts to each of row of the memory array based on a hashing filter.

48. The die of clause 47, wherein the processor is configured to:
  receive a memory address;
  receive a second signal indicating that an error correcting coder error has been detected;
  apply the hashing filter to the memory address to determine a corresponding row of the memory array; and
  increment the error count within the row error count buffer for the corresponding row of the memory array.

49. The die of any of clauses 40-48, wherein the processor is configured to:
  compare the error count for the first memory row to a threshold error count; and
  determine the error count is greater than or equal to the threshold error count.

50. The die of any of clauses 40-49, wherein the processor is configured to:
  read access data for each row of the memory array from an access buffer;
  determine, based on the access data, a least recent memory access of the rows of the memory array; and
  determine the second memory row based on the least recent memory access.

51. The die of clause 50, wherein the access buffer is a circular buffer, and wherein the processor is configured to determine the least recent memory access based on a position of the access data within the circular buffer.

52. The die of any of clauses 40-51, wherein the data stored at the first memory row comprises tag data and user data.

Although the methods described above are with reference to the illustrated flowcharts, many other ways of performing the acts associated with the methods may be used. For example, the order of some operations may be changed, and some embodiments may omit one or more of the operations described and/or include additional operations.

In addition, the methods and system described herein may be at least partially embodied in the form of computer-implemented processes and apparatus for practicing those processes. The disclosed methods may also be at least partially embodied in the form of tangible, non-transitory machine-readable storage media encoded with computer program code that, when executed, causes a machine to fabricate at least one integrated circuit that performs one or more of the operations described herein. For example, the methods may be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for causing a machine to fabricate the integrated circuit. The methods may also be at least partially embodied in the form of a computer into which computer program code is loaded or executed, such that, the computer becomes a special purpose computer for causing a machine to fabricate the integrated circuit. For instance, when implemented on a general-purpose processor, computer program code segments can configure the processor to create specific logic circuits. The methods may alternatively be at least partially embodied in application specific integrated circuits or any other integrated circuits for performing the methods.

In addition, terms such as "circuit," "circuitry," "logic," and the like can include, alone or in combination, analog circuitry, digital circuitry, hardwired circuitry, programmable circuitry, processing circuitry, hardware logic circuitry, state machine circuitry, and any other suitable type of physical hardware components. Further, the embodiments described herein may be employed within various types of devices such as networking devices, telecommunication devices, smartphone devices, gaming devices, enterprise devices, storage devices (e.g., cloud storage devices), automobile systems (e.g., collision avoidance systems, object detection systems, navigation systems, etc.), and computing devices (e.g., cloud computing devices), among other types of devices.

The subject matter has been described in terms of exemplary embodiments. Because they are only examples, the claimed inventions are not limited to these embodiments. Changes and modifications may be made without departing the spirit of the claimed subject matter. It is intended that the claims cover such changes and modifications.

We claim:

1. A die comprising:
   a row decoding logic coupled to a memory array and configured to:
      receive address data; and
      generate a row selection signal;
   a row error count buffer configured to maintain an error count for each row of the memory array; and
   a processor configured to write data stored at a first memory row of the memory array to a second memory row of the memory array.

2. The die of claim 1, wherein the processor is configured to:
   receive a signal indicating that decoding errors have been detected;
   in response to the signal, read an error count for each row of the memory array from the row error count buffer;
   determine the first memory row of the memory array based on the error counts; and
   determine the second memory row of the memory array based on access data characterizing memory accesses of the rows of the memory array.

3. The die of claim 2 comprising decoding logic, wherein the decoding logic is configured to generate the signal in response to determining a number of error correcting code errors over a time interval.

4. The die of claim 3, wherein the decoding logic is configured to:
   compare the number of error correcting code errors to a threshold error value;
   determine, based on the comparison, that the number of error correcting code errors are greater than or equal to the threshold error value; and
   generate the signal in response to the determination.

5. The die of claim 1, wherein the processor is configured to disable the first memory row.

6. The die of claim 5, wherein the processor is configured to enable the first memory row after a predetermined amount of time.

7. The die of claim 1, wherein the processor is configured to:
   determine a greatest error count from the error counts; and
   determine the first memory row based on the greatest error count.

8. The die of claim 1, wherein the processor is configured to determine a mapping of the error counts to each of row of the memory array based on a hashing filter.

9. The die of claim 8, wherein the processor is configured to:
   receive a memory address;
   receive a second signal indicating that an error correcting code error has been detected;
   apply the hashing filter to the memory address to determine a corresponding row of the memory array; and
   increment the error count within the row error count buffer for the corresponding row of the memory array.

10. The die of claim 1, wherein the processor is configured to:
    compare the error count for the first memory row to a threshold error count; and
    determine the error count is greater than or equal to the threshold error count.

11. The die of claim 1, wherein the processor is configured to:
    read access data for each row of the memory array from an access buffer;
    determine, based on the access data, a least recent memory access of the rows of the memory array; and
    determine the second memory row based on the least recent memory access.

12. The die of claim 11, wherein the access buffer is a circular buffer, and wherein the processor is configured to determine the least recent memory access based on a position of the access data within the circular buffer.

13. The die of claim 1, wherein the data stored at the first memory row comprises tag data and user data.

14. A method by a processor comprising:
    receiving a signal indicating that decoding errors have been detected;
    in response to the signal, receiving an error count corresponding to each of a plurality of memory rows of a memory device;
    determining a first memory row of the plurality of memory rows based on the error counts;
    determining a second memory row of the plurality of memory rows based on access data characterizing memory accesses of the plurality of memory rows; and
    writing data stored at the first memory row to the second memory row of the memory device.

15. The method of claim 14, further comprising disabling the first memory row.

16. The method of claim 15, further comprising enabling the first memory row after a predetermined amount of time.

17. The method of claim 14, further comprising:
    determining a greatest error count from the error counts; and
    determining the first memory row based on the greatest error count.

18. The method of claim 14, further comprising:
    comparing the error count for the first memory row to a threshold error count; and
    determining the error count is greater than or equal to the threshold error count.

19. The method of claim 14, further comprising:
reading the access data for each of the plurality of memory rows from an access buffer;
determining, based on the access data, a least recent memory access of the plurality of memory rows; and
determining the second memory row based on the least recent memory access.

20. A die package comprising:
a memory device; and
a processor communicatively coupled to the memory device, the processor configured to:
  receive a signal indicating that decoding errors have been detected;
  in response to the signal, receive an error count corresponding to each of a plurality of memory rows of the memory device;
  determine a first memory row of the plurality of memory rows based on the error counts;
  determine a second memory row of the plurality of memory rows based on access data characterizing memory accesses of the plurality of memory rows; and
  write data stored at the first memory row to the second memory row of the memory device.

* * * * *